United States Patent [19]
Tanaka

[11] Patent Number: 5,306,582
[45] Date of Patent: Apr. 26, 1994

[54] NONAQUEOUS BATTERY SEALED WITH A MONTMORILLONITE MATERIAL

[75] Inventor: Mitsutoshi Tanaka, Kanagawa, Japan

[73] Assignee: Fuji Photo Film Co., Ltd., Kanagawa, Japan

[21] Appl. No.: 78,049

[22] Filed: Jun. 18, 1993

[30] Foreign Application Priority Data

Jun. 23, 1992 [JP] Japan .................. 4-164546

[51] Int. Cl.⁵ .................. H01M 2/08
[52] U.S. Cl. .................. 429/185; 429/194
[58] Field of Search .............. 429/185, 174, 171, 194

[56] References Cited

U.S. PATENT DOCUMENTS

| | | | |
|---|---|---|---|
| 4,184,007 | 1/1980 | Urry | 429/8 |
| 4,248,944 | 2/1981 | Smilanich | 429/185 |
| 4,256,815 | 3/1981 | Smilanich et al. | 429/185 |
| 4,503,133 | 3/1985 | van Lier et al. | 429/174 |

FOREIGN PATENT DOCUMENTS

2200792  8/1988  European Pat. Off. .
1124953  5/1989  Japan .................. H01M 2/08

Primary Examiner—John S. Maples
Attorney, Agent, or Firm—Sughrue, Mion, Zinn, Macpeak & Seas

[57] ABSTRACT

A nonaqueous battery having a positive electrode made of an active material of light metal or its alloy or an active material capable of intercalating/deintercalating lithium ion, and a nonaqueous electrolyte, in which the battery is sealed with a sealant containing a pitch and at least one montmorillonite group material. In a preferred embodiment, the amount of the montmorillonite group material is in the range of 2 to 30% by weight based on the total weight of the sealant minus solvents. The pitch may be a blown asphalt and the at least one montmorillonite group material may be a tri-octahedron type montmorillonite group material comprising a quaternary ammonium intercalated between layers. Alternatively, the pitch may be blown asphalt having a penetration (25° C.) of 10 to 20 and the at least one montmorillonite group material may be a hectolite comprising a quaternary ammonium intercalated between layers.

29 Claims, 2 Drawing Sheets

NONAQUEOUS BATTERY SEALED WITH A MONTMORILLONITE MATERIAL

FIELD OF THE INVENTION

The present invention relates to a nonaqueous battery comprising an active material of light metal or its alloy or an active material capable of intercalating/deintercalating lithium ion as a negative electrode. In particular, the present invention relates to a sealant for a nonaqueous battery having improved sealing strength.

BACKGROUND OF THE INVENTION

A nonaqueous battery comprises an active material that can easily react with water (a light metal or its alloy or a material capable of intercalating/deintercalating lithium ion) as a negative electrode. Therefore, the nonaqueous battery is arranged such that there is no water incorporated in the electrolyte, and the battery container is hermetically sealed to prevent water from entering the container. The battery container consists of a can or metal member and an insulating sealing material (also referred to as "gasket"). In order to provide perfect sealing, a sealant is interposed between the can or metal member and the insulating sealing material. As such sealants, there have been proposed various compounds which allegedly can prevent the entry of water and exhibit resistance to an organic solvent, which is contained in the battery as an electricity-generating element. Among these proposed compounds, a pitch (bituminous substance) such as asphalt and coal tar are most widely used. JP-A-56-32671, JP-A-57-194453, JP-A-58-10365, and JP-A-59-859 (the term "JP-A" as used herein means an "unexamined published Japanese patent application") disclose the use of pitch by itself as a sealant. These patents describe that the selection of a particular pitch having proper physical properties or the coating of such a sealant on the surface of both the metal member and the insulating sealing material renders the battery more resistant to liquid leakage at a temperature as high as 60° C. at a relative humidity of 90%. However, their effects leave much to be desired.

Thus, mixtures of pitch with the following compounds have been proposed. One of these proposals is a mixture of pitch with a mineral oil as disclosed in JP-B-61-36344 (the term "JP-B" as used herein means an "examined Japanese patent publication"). This proposal allegedly provides a further improvement in the resistance of the battery to liquid leakage during storage at a temperature as high as e.g., 60° C. for 100 days or in a 60° C.-minus 10° C. heat cycle. JP-A-U-57-194254 (the term "JP-A-U" as used herein means an "unexamined published Japanese utility model application"), JP-A-58-112246, JP-A-59-78443, and JP-A-63-80471 disclose mixing a pitch with a silicone rubber. This approach allegedly provides an improvement in the resistance of the battery to liquid leakage during storage at a temperature as high as e.g., 60° C. for 100 days or in a 60° C.-minus 10° C. heat cycle. Further, a method which comprises mixing a pitch with a thermoplastic or thermosetting resin is proposed in JP-A-59-91660, and JP-A-63-202845. This approach allegedly provides an improvement in the resistance of the battery to liquid leakage during storage at a temperature as high as e.g., 60° C. or 70° C. for 100 days or in a 60° C.-minus 10° C. heat cycle by mixing a pitch with vinyl acetate or atactic polypropylene as a resin. JP-B-63-1706 discloses that the use of a cationic aqueous dispersion obtained by dispersion-suspending either a pitch (asphalt) or a rubber latex (e.g., styrene-butadiene rubber, butadiene rubber, chloroprene rubber, ethylenepropylene rubber) or a mixture thereof in water with a cationic surface active agent as a sealant allegedly provides an improvement in the resistance of the battery to liquid leakage during the storage at a temperature as high as 45° C. at a relative humidity of 90% for 1 to 12 months. These approaches do provide an improvement in the resistance of the battery to liquid leakage during storage at elevated temperature. However, even these improved approaches leave much to be desired in the following respects.

Figure 2:
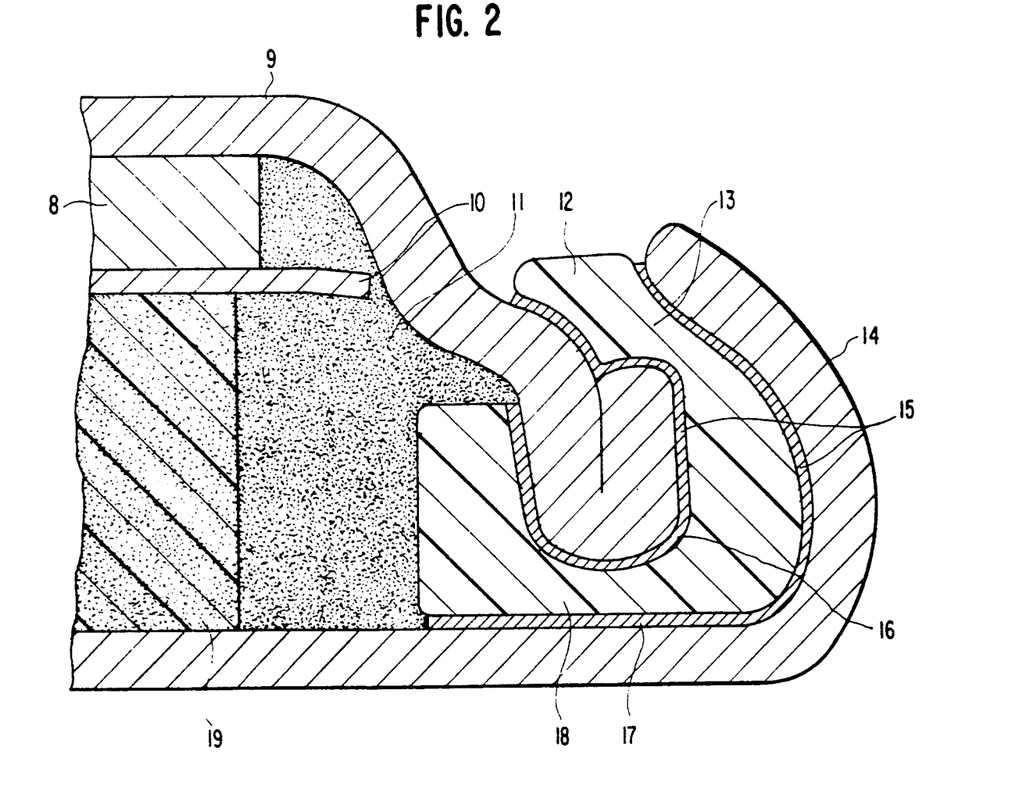
FIG. 2 is an enlarged detail of the part A of FIG. 1 wherein the sealant portion is shown highlighted for explanation (thickness is shown greater than actual)

The sealing of a nonaqueous battery can be accomplished by pressing a negative electrode can or positive electrode can against an insulating sealing material made of a synthetic resin via a sealant as shown by the reference numerals 12, 13, 14 and 15 in FIG. 2. The strength by which the negative or positive can is pressed against the sealing material is sealing strength. The sealing strength is affected by the shape of the sealing mold and the molding size of the insulating synthetic resin sealing material or metal member. In particular, the sealing mold is gradually worn away as the sealing process is repeatedly conducted. As a result, the sealing strength is gradually reduced. Therefore, nonaqueous batteries prepared according to the aforementioned proposed methods leave much to be desired in their resistance to liquid leakage when the sealing strength is reduced.

SUMMARY OF THE INVENTION

It is therefore an object of the present invention to provide a nonaqueous battery having excellent resistance to liquid leakage which is not affected by sealing strength fluctuations.

The aforementioned object of the present invention will become more apparent from the following detailed description and examples.

The object of the present invention is accomplished with a battery comprising a positive electrode, a negative electrode made of an active material of light metal or its alloy or an active material capable of intercalating/deintercalating lithium ion, and a nonaqueous electrolyte, wherein the battery is sealed off with a sealant comprising a pitch and at least one montmorillonite group.

The object of the present invention is also accomplished with a battery comprising a positive electrode, a negative electrode made of an active material of light metal or its alloy or an active material capable of intercalating/deintercalating lithium ion, and a nonaqueous electrolyte, wherein the battery is sealed off with a sealant comprising a pitch, at least one polymer and at least one montmorillonite group.

BRIEF DESCRIPTION OF THE DRAWINGS

By way of example and to make the description more clear, reference is made to the accompanying drawings in which:

FIG. 3 is an embodiment of a cylindrical battery according to the present invention wherein the sealant portion is shown highlighted (the thickness is shown greater than actual), in which the reference numerals 1, 5, 12, 13, 18, and 23 each represents an insulating sealing material made of a synthetic resin (polypropylene). The reference numerals 2, 9, and 24 each represents a negative electrode can which also serves as a negative electrode terminal. The reference numerals 3, 8, and 26 each represents a negative electrode. The reference numerals 4, 10, and 27 each represents a separator. The reference numerals 6, 19, and 25 each represents a positive electrode. The reference numerals 7, and 14 each represents a positive electrode can which also serves as a positive electrode terminal. The reference numeral 11 represents an electrolyte. The reference numerals 15, 16, 17 and 22 each represents a sealant. The reference numeral 20 represents a positive electrode pin which also serves as a positive electrode terminal, and the reference numeral 21 represents a positive electrode cap which also serves as a positive electrode terminal.

DETAILED DESCRIPTION OF THE INVENTION

The montmorillonite group to be used in the present invention is also referred to as "smectites" and is a typical group of minerals constituting clay. The montmorillonite group belongs to the phyllosilicate class of minerals, all of which have a three-layer structure. This three-layer structure is known to consist of a tetrahedral sheet (a tetrahedron comprising Si(IV) or Al(III) surrounded by four oxygen atoms, three of the four apexes of which being shared with three of the four apexes of an adjacent tetrahedron and the other extending in the same plane as the corresponding apex of the adjacent tetrahedron to form a hexagonal net), an octahedral sheet (an octahedron comprising a middle-sized cation such as Al(III), Mg(II) and Fe(II), optionally Fe(III), Cr(III), Mn(II) and Li, surrounded by six hydroxyl groups or oxygen atoms, the edges of which being shared with that of adjacent octahedron to make a two-dimensional extension), and a tetrahedral sheet as defined above in this order, with cations, organic materials or the like being intercalated between one three-layer structure and another (hereinafter referred to as "between layers"). The chemical composition of montmorillonite group can be represented by the following general formula:

$$X_m(Y(II), Y(III))_{2-3}Z_4O_{10}(OH)_2 \cdot nH_2O$$

wherein X represents a metal (e.g., an alkaline metal such as K and Na, an alkaline earth metal such as $\frac{1}{2}$ Ca and $\frac{1}{2}$ Mg) or an organic material (e.g., amine, amine derivative); Y(II) represents Mg, Fe(II), Mn(II), Ni, Zn or Li; Y(III) represents Al, Fe(III), Mn(III) or Cr(III); and Z represents Si or Al, with the proviso that X represents a cation present between layers, Y represents a cation present in the octahedron, Z represents a cation present in the tetrahedron, the symbols I, II, III and IV each represents the ionic valency of the respective element, $nH_2O$ represents water present between layers, m represents 0.25 to 0.6, and n represents an integer.

m represents the number of cations, X's present between layers. The value for m is a value for compensating the insufficiency of electric charge of constitution ions present inside a layer of the above-described tetrahedral sheet-octahedral sheet-tetrahedral sheet, and the value is not constant but is in the range of from 0.25 to 0.6. (When X is Ca or Mg, m tends to become larger.) When X is a monovalent ion, an average value for m has been known to be 0.33 (U.S. Geol. Surv., Profess. Pap., 205-B, 23 (1945)).

n represents the number of water molecules present between layers.

The montmorillonite group suitable for use in the present invention can be classified as follows:

(1) Bi-octahedron type (Cations present in the octahedron are mainly trivalent)

Montmorillonite $$X_{0.33}(Al_{1.67}Mg_{0.33})Si_4O_{10}(OH)_2 \cdot nH_2O$$

Magnesia montmorillonite $$X_{0.33}(Al_{1.34}Mg_{0.83})Si_4O_{10}(OH)_2 \cdot nH_2O$$

Ferric montmorillonite $$X_{0.33}((Fe_3{}^+)_{1.67}Mg_{0.33})Si_4O_{10}(OH)_2 \cdot H_2O$$

Ferric magnesia montmorillonite $$X_{0.33}((Fe_3{}^+)_{1.34}Mg_{0.33})Si_4O_{10}(OH_2) \cdot nH_2O$$

Bidelite $$X_{0.33}(Al_2)Al_{0.33}Si_{3.67}O_{10}(OH)_2 \cdot nH_2O$$

Aluminian bidelite $$X_{0.33}(Al_{2.17})(Al_{0.83}Si_{3.17})O_{10}(OH)_2 \cdot nH_2O$$

Nontronite $$X_{0.33}((Fe_3{}^+)_2)(Al_{0.33}Si_{3.67})O_{10}(OH)_2 \cdot nH_2O$$

Aluminian nontronite $$X_{0.33}((Fe_3{}^+)_{2.17})(Al_{0.83}Si_{3.17})O_{10}(OH)_2 \cdot nH_2O$$

(2) Tri-octahedron type (Cations present in the octahedron are mainly bivalent)

Saponite $$X_{0.33}(Mg_3)(Al_{0.33}Si_{3.67})O_{10}(OH)_2 \cdot nH_2O$$

Aluminian saponite $$X_{0.33}(Mg_{2.67}Al_{0.33})(Al_{0.67}Si_{3.33})O_{10}(OH)_2 \cdot nH_2O$$

Ferric saponite $$X_{0.33}(Mg, Fe)_3(Al_{0.33}Si_{3.67})O_{10}(OH)_2 \cdot nH_2O$$

Hectolite $$X_{0.33}(Mg_{2.67}Li_{0.33})Si_4O_{10}(OH)_2 \cdot nH_2O$$

Sorkonite $$X_{0.33}(Mg, Zn)_3(Si_{3.67}Al_{0.33})O_{10}(OH)_2 \cdot nH_2O$$

Stibinsite $$X_{0.33/2}(Mg_{2.97})Si_4O_{10}(OH)_2 \cdot nH_2O$$

Preferred among these montmorillonite groups are the tri-octahedron type montmorillonite groups, particularly hectolite.

The montmorillonite group to be used in the present invention may comprise a metal (e.g., alkaline metal such as K and Na, alkaline earth metal such as Ca and Mg) or organic material (e.g., amine, amine derivative) as an X ion present between layers. Preferred examples of such a metal include K, Na, Ca, Mg, and Li. Preferred examples of the organic material include amines or amine derivatives.

The amines or amine derivatives can be represented by the following general formula:

In the above general formula, $R_1$, $R_2$, $R_3$, and $R_4$ each represents —H, an alkyl group, allyl group, an aryl group, an aralkyl group or the like (some of these groups may contain —OH, —O—, C=C, etc.). $R_2$, $R_3$, $R_4$ and N may together form an aromatic ring such as pyridinium. Preferred among these compounds represented by the above general formula is one wherein at least one of $R_1$, $R_2$, $R_3$, and $R_4$ is a substituent containing a $C_{10-24}$ alkyl or benzyl group or aromatic ring.

The organic material may be a phosphonium, oxonium, sulfonium, arsonium, stibonium or the like.

The term "pitch (bituminous substance)" as used herein is a general term for the residue of the distillation of tar obtained by dry distillation of coal, charcoal, petroleum, etc. or analogous natural oils. A pitch is classified as coal tar (tar obtained by heat treatment of coal), wood tar (tar obtained by heat treatment of wood), petroleum asphalt (still residue obtained by purification of petroleum; also referred to as "petroleum pitch") or natural asphalt (occurs naturally in the bottom of lakes and in rocks). Among these tars, coal tar and wood tar contain a large amount of strongly carcinogenic substances and thus are designated as harmful substances. Thus, asphalts are preferred. Preferred among these asphalts are petroleum asphalts in view of controllability of physical properties such as penetration, softening point and extensibility. The term "penetration" stands for the hardness of asphalts. It represents the length at which the prescribed needle sticks into a sample under the prescribed conditions. The length is expressed taking 0.1 mm as a standard (1). The larger the numeral is, the softer is the sample. Petroleum asphalts are considered to comprise an oily component (regarded as a mixture of saturated hydrocarbon and aromatic hydrocarbon; referred to as "medium", "petrolene", "malthene", or the like), a resinous component (regarded as containing asphalt resin, asphaltic acid, etc.), and a fine carbon component (classified as asphaltene, carbene or pyrobitumen) and thus cannot be definitely classified by component. In accordance with JIS-K2207, petroleum asphalts are classified as straight asphalts (10 kinds) or blown asphalts (5 kinds) by production process (presence or absence of blowing) and physical properties of finished products. Most preferred among these petroleum asphalts are blown asphalts, which exhibit a high softening point, a high elasticity and a low temperature sensitivity. Preferred among these blown asphalts is one having a penetration (25° C.) of 0 to 40, more preferably 5 to 30, most preferably 10 to 20 as defined by JIS-K2207 or ASTM D 9466 and D 5 and a softening point of 60° C. or higher, more preferably 80° C. or higher, most preferably 90° C. or higher as defined by JIS-K2207 or ASTM D 9466 and D 36. The most preferred specific example of a combination of the two properties is a combination of a penetration of 10 to 20 and a softening point of 90° C. to 100° C. or a combination of a penetration of 10 to 20 and a softening point of 135° C. to 155° C.

The pitch to be used in the present invention may be used in admixture with mineral oils, vegetable oils, waxes, paraffins, vinyl acetate homopolymer or copolymers, polyamide resins, atactic polypropylenes, etc., singly or in combination, with the former/the latter mixing proportion (by weight) being preferably in the range of 95/5 to 50/50, more preferably in the range of 90/10 to 70/30.

The combination of pitch and montmorillonite group is preferably a combination of petroleum asphalt as a pitch and montmorillonite group comprising quaternary ammonium ion intercalated as an X ion between layers as montmorillonite group, more preferably a combination of blown asphalt as a pitch and tri-octahedron type montmorillonite group comprising quaternary ammonium ion intercalated as an X ion between layers as montmorillonite group, most preferably a combination of blown asphalt having a penetration (25° C.) of 10 to 20 as a pitch and hectolite comprising quaternary ammonium intercalated as an X ion between layers as montmorillonite group.

The proportion of the total amount of montmorillonite group in the sealant is in the range of 0.2 to 40% by weight, preferably 2 to 30% by weight, more preferably 3 to 20% by weight, most preferably 5 to 10% by weight based on the total weight of the sealant minus solvents such as toluene.

The polymer to be used in the present invention is a high molecular compound having a molecular weight of hundreds. Examples of the polymer of the present invention include rubbers (general term of high molecular compounds having rubber-like elasticity in the vicinity of normal temperature; also referred to as "elastomers") and plastomers (general term of thermoplastic or thermosetting high molecular compounds). In the present invention, there may be used many kinds of polymers as exemplified below. These polymers may be used singly or in combination as necessary.

Examples of the plastomers to be used in the present invention include polyvinyl acetate, atactic polypropylene, polystyrene, polybutene, polyamide, and polythiol. Preferred among these plastomers are polybutene, polyamide, polythiol, and atactic polypropylene. Further preferred among these plastomers is polybutene (copolymer of isobutyrene containing a small amount of n-butene; existing chemical substance name: "polybutene"; existing chemical substance number: "6-774"). The most preferred polybutene is one having an average molecular weight of 500 to 5,000. The sealant to be used in the present invention may have any pitch-/polybutene mixing proportion (by weight). The pitch-/polybutene mixing proportion (by weight) is preferably in the range of 95/5 to 40/60, particularly 85/15 to 60/40.

There are many kinds of rubbers to be used in the present invention. Preferred among these rubbers are nonsilicone rubbers. Further preferred among these rubbers are rubbers having double bonds in the main chain or side chains or rubbers whose main chain is a copolymer of at least two polymerizable monomers.

Preferred examples of rubbers to be used in the present invention include natural rubber (NR), isoprene rubber (IR), butadiene rubber (BR), 1,2-polybutadiene (1,2-BR), styrene-butadiene rubber (SBR), chloroprene rubber (CR), nitrile rubber (NBR), butyl rubber (IIR), ethylene-propylene rubber (EPM), ethylene-propylene-diene monomer rubber (EPDM), chlorosulfonated polyethylene (CSM), and acryl rubber (ACM, ANM) (symbol in the parenthesis indicates abbreviation according to ASTM hereinafter). Further preferred among these rubbers are isoprene rubber (IR), styrene-butadiene rubber (SBR), chloroprene rubber (CR), nitrile rubber (NBR), ethylene-propylene rubber (EPM), ethylene-propylene-diene monomer rubber (EPDM), and chlorosulfonated polyethylene (CSM). Most preferred among these rubbers is EPDM whose main chain is a terpolymer of ethylene unit, propylene unit and diene unit.

EPDM to be used in the present invention preferably exhibits a Mooney viscosity (determined at a temperature of 100° C.; the higher this value is, the higher is the molecular weight of the compound) of 20 to 200, more preferably 30 to 150, most preferably 40 to 80. There are many possible diene units to be incorporated in EPDM of the present invention. Preferred among these diene units are dicyclopentadiene, and ethylidene norbornene. Further preferred among these diene units is ethylidene norbornene. EPDM to be used in the present invention may have a wide range of ethylene/propylene proportion (by weight). It is preferably in the range of 50/50 to 70/30. The sealant to be used in the present invention may have any pitch/EPDM mixing proportion (by weight). It is preferably in the range of 99.9/0.1 to 30/70, more preferably 98/2 to 80/20.

EPM to be used in the present invention preferably exhibits a Mooney viscosity of 20 to 200, more preferably 30 to 120. EPM to be used in the present invention may have a wide range of ethylene/propylene proportion (by weight). It is preferably in the range of 50/50 to 70/30. The sealant to be used in the present invention may have any pitch/EPM mixing proportion (by weight). It is preferably in the range of 99.9/0.1 to 30/70, more preferably 98/2 to 80/20.

SBR to be used in the present invention preferably exhibits a Mooney viscosity of 20 to 200, more preferably 30 to 80. SBR to be used in the present invention may have a wide range of styrene/butadiene proportion (by weight). It is preferably in the range of 15/85 to 30/70. The sealant to be used in the present invention may have any pitch/SBR mixing proportion (by weight). It is preferably in the range of 60/40 to 30/70.

NBR to be used in the present invention preferably exhibits a Mooney viscosity of 20 to 200, more preferably 30 to 80. NBR to be used in the present invention may have a wide range of acrylonitrile/butadiene proportion (by weight). It is preferably in the range of 15/85 to 30/70, more preferably 15/85 to 25/75. The sealant to be used in the present invention may have any pitch/NBR mixing proportion (by weight). It is preferably in the range of 70/30 to 30/70.

IR, CR, and CSM to be used in the present invention may have the following mixing proportions: pitch/IR mixing proportion (by weight) of preferably 97/3 to 70/30, more preferably 95/5 to 80/20, pitch/CR mixing proportion (by weight) of preferably 97/3 to 50/50, more preferably 95/5 to 80/20, and pitch/CSM mixing proportion (by weight) of preferably 99/1 to 80/20, more preferably 95/5 to 85/15.

Specific examples of the combination of pitch, polymer and montmorillonite group will be given below. (As previously mentioned, there are many preferred combinations. Therefore, the present invention is not limited to the following examples.) Preferred examples include a combination of petroleum asphalt as a pitch, rubber as a polymer and montmorillonite group comprising quaternary ammonium ion intercalated as an X ion between layers as montmorillonite group, a combination of blown asphalt as a pitch, nonsilicone rubber as a polymer and three-octahedral montmorillonite group comprising quaternary ammonium ion intercalated as an X ion between layers as montmorillonite group, and a combination of blown asphalt having a penetration of 10 to 20 (as determined at a temperature of 25° C.) as a pitch, EPDM as a polymer and hectolite comprising quaternary ammonium ion intercalated as an X ion between layers as montmorillonite group.

In the present invention, sealing with a sealant comprising a pitch and at least one montmorillonite can be carried out by a process which comprises separately or simultaneously dissolving or dispersing a pitch and a montmorillonite group in a nonpolar organic solvent, optionally removing sand, iron, manganese, insoluble matters, etc. from the sealant by filtration, sedimentation or the like as described in JP-A-54-162138, mixing the materials, adjusting the sealant to a proper viscosity, coating the sealant on either the portion of a metallic battery case serving also as a positive or negative electrode terminal to be in contact with an insulating sealing material or its vicinity or the portion of the insulating sealing material to be in contact with the metallic battery case or its vicinity or both, and then evaporating the organic solvent to form a sealant coating film thereon. Specific examples of the organic solvent include toluene, xylene, cyclohexane, hexane, chloroform, dichloroethane, dichloromethane, and a mixture thereof.

Another specific sealing method comprises heating a pitch to a temperature of 100° to 200° C. so that it is softened, adding a montmorillonite group to the pitch, kneading the mixture to make a uniform dispersion, and then coating the sealant on either the portion of a metallic battery case serving also as a positive or negative electrode terminal to be in contact with an insulating sealing material or its vicinity or the portion of the insulating sealing material to be in contact with the metallic battery case or its vicinity or both to form a sealant coating film thereon.

A further specific method comprises adding a small amount of an organic solvent to a pitch so that the pitch is softened, adding a montmorillonite group to the pitch, kneading the mixture to make a uniform dispersion, coating the sealant on either the portion of a metallic battery case serving also as a positive or negative electrode terminal to be in contact with an insulating sealing material or its vicinity or the portion of the insulating sealing material to be in contact with the metallic battery case or its vicinity or both, and then evaporating the organic solvent to form a sealant coating film thereon. Specific examples of the organic solvent include toluene, xylene, cyclohexane, hexane, chloroform, dichloroethane, dichloromethane, and a mixture thereof.

The proportion of the total amount of pitch in the sealant is in the range of 3 to 30% by weight based on the total weight of the sealant inclusive of solvent. The proportion of the total amount of pitch in the sealant is in the range of 50 to 98% by weight, preferably 70 to 95% by weight, based on the solids content.

As the active material to be used in the present invention there may be used any electrode material for nonaqueous battery. Examples of inorganic positive electrode active materials for lithium battery include Co oxides (as described in JP-A-52-12424, DE-2,606,915), Li-Co oxides (as described in U.S. Pat. Nos. 3,945,848, 4,340,652), Li-Ni-Co oxides (as described in EP-A-243,926, JP-A-63-114063, JP-A-63-211565, JP-A-63-299056, JP-A-1-120765), V oxides (as described in FR 21,611,796, JP-A-55-53077, JP-A-62-140362, JP-A-62-227358), Li-V oxides ("Denki Kagaku (Electrochemistry)", vol. 48, 432 (1980), "Journal of Electrochemical Society", vol. 130, 1225 (1983), JP-A-2-12769), Mn oxides (as described in EP 269,855, JP-A-63-58761), Li-Mn oxides (as described in JP-A-56-136464, JP-A-56-114064, JP-A-56-114065, JP-A-56-148550, JP-A-56-221559, JP-A-1-5459, JP-A-1-109662, JP-A-1-128371, JP-A-1-209663, JP-A-2-27660), and Li-Ni-Mn oxides (as described in JP-A-63-210028).

Examples of organic high molecular positive electrode active materials include polyaniline derivatives (as described in "Molecular Crystal and Liquid Crystal", vol. 121, 173 (1985), JP-A-60-197728, JP-A-63-46223, JP-A-63-243131, JP-A-2-219823), pyrrole derivatives (as described in "Journal of Chemical Society", Chemical Communication, 854, (1979), DE 307,954A, JP-A-62-225517, JP-A-63-69824, JP-A-1-170615), polythiophene derivatives (as described in JP-A-58-187432, JP-A-1-12775), polyacene derivatives (as described in JP-A-58-209864), and polyparaphenylene derivatives. These derivatives include copolymers.

For these organic high molecular compounds, reference can be made to Naoya Ogata, "Dodensei Kobunshi (Electrically Conductive High Molecular Compounds", Kodansha Scientific, (1990).

Examples of the light metal or its alloy to be used as negative electrode active materials in the present invention include lithium metals, and lithium alloys (e.g., Li-Al, Li-Al-Mn (U.S. Pat. No. 4,820,599), Li-Al-Mg (JP-A-57-98977), Li-Al-Sn (JP-A-63-6742), Li-Al-In, Li-Al-Cd (JP-A-1-144573). These light metals and alloys can be used for primary battery as well as secondary battery.

Examples of the active material capable of intercalating/deintercalating lithium ion as used herein include calcined carbonaceous compounds (as described in JP-A-58-209864, JP-A-61-214417, JP-A-62-88269, JP-A-62-216170, JP-A-63-13282, JP-A-63-24555, JP-A-63-121247, JP-A-63-121257, JP-A-63-155568, JP-A-63-276873, JP-A-63-314821, JP-A-1-204361, JP-A-1-221859, JP-A-1-274360), and lithium-containing transition metal oxides obtained by calcination.

The electrode compound may normally comprise an electrically conductive material such as carbon, silver (as described in JP-A-63-148554) or polyphenylene derivative (as described in JP-A-59-20971) incorporated therein.

The electrolyte consists of at least one aprotic organic solvent such as propione carbonate, ethylene carbonate, $\gamma$-butyrolactone, 1,2-dimethoxyethane, tetrahydrofuran, 2-methyltetrahydrofuran, dimethylsulfoxide, 1,3-dixorane, formaldehyde, dimethylformamide, dioxorane, acetonitrile, nitromethane, triester phosphate (as described in JP-A-60-23973), trimethoxymethane (as described in JP-A-61-4170), dioxorane derivatives (as described in JP-A-62-15771, JP-A-62-22372, and JP-A-62-108474), sulforane (as described in JP-A-62-31959), 3-methyl-2-oxazolidione (as described in JP-A-62-44961), propione carbonate derivative (as described in JP-A-62-290069, and JP-A-62-290071), tetrahydrofuran derivative (as described in JP-A-63-32872), ethyl ether (as described in JP-A-63-62166), and 1,3-propanesultone (as described in JP-A-63-102173) and a lithium salt soluble in such a solvent, such as $LiClO_4$, $LiBF_4$, $LiPF_6$, $LiCF_3SO_3$, $LiCF_3CO_3$, $LiAsF_6$, $LiSbF_6$, $LiB_{10}Cl_{10}$ (as described in JP-A-57-74974), $Li(1,2\text{-dimethoxyethane})_2ClO_4$ (as described in JP-A-57-74977), lower aliphatic carboxylate of lithium (as described in JP-A-60-41773), $LiAlCl_4$, LiCl, LiBr, LiI (as described in JP-A-60-247265), lithium chloroborane compound (as described in JP-A-61-165957) and lithium tetraphenylborate (as described in JP-A-61-214376). Typical among these combinations is an electrolyte comprising $LiClO_4$ or $LiBF_4$ incorporated in a mixture of propione carbonate and 1,2-dimethoxyethane.

The nonaqueous battery of the present invention may comprise a solid electrolyte as mentioned below besides such an electrolyte. (The term "nonaqueous electrolyte" as used herein also means a solid electrolyte as mentioned below.) In this case, some solid electrolytes cause no liquid leakage. However, under the conditions on which a battery comprising a liquid electrolyte causes liquid leakage, a battery comprising such a solid electrolyte loses airtightness and exhibits poor storability. Thus, the present invention is applied to a liquid electrolyte battery as well as a solid electrolyte battery. Solid electrolytes are classified as inorganic solid electrolytes or organic solid electrolytes. As such inorganic solid electrolytes Li nitrides, halides and oxyacids are well known. Useful among these compounds are $Li_3N$, LiI, $Li_5NI_2$, $Li_3N$-LiI-LiOH, $LiSiO_4$, $LiSiO_4$-LiI-LiOH (as described in JP-A-49-81899), $xLi_3PO_4$-$(1-x)Li_4SiO_4$ (as described in JP-A-59-60866), $Li_2SiS_3$ (as described in JP-A-60-501731), and phosphorus sulfide (as described in JP-A-62-82665). Useful examples of organic solid electrolytes include polyethylene oxide derivatives or polymers containing such polyethylene oxide derivatives (as described in JP-A-63-135447), polypropylene oxide derivatives or polymers containing such polypropylene oxide derivatives, polymers containing ion dissociation groups (as described in JP-A-62-254302, JP-A-62-254303, and JP-A-63-193954), mixtures of polymers containing ion dissociation groups and the aforementioned aprotic electrolytes (as described in U.S. Pat. Nos. 4,792,504, and 4,830,939, and JP-A-62-22375, JP-A-62-22376, JP-A-63-22375, JP-A-63-22776, and JP-A-1-95117), and phosphoric ester polymers (as described in JP-A-61-256573). Further, a polyacrylonitrile may be incorporated in an electrolyte (as described in JP-A-62-278774). Moreover, an inorganic solid electrolyte and an organic solid electrolyte may be used in combination (as described in JP-A-60-1768).

A separator is an insulating thin membrane having a high ion permeability and a predetermined mechanical strength. From the standpoint of resistance to organic solvent and hydrophobicity, nonwoven cloth of olefin such as polypropylene, glass fiber, etc. may be used.

As the carrier for electrode active materials there may be used, for a positive electrode, ordinary stainless steel, nickel and aluminum as well as porous foamed metal for use in electrically conductive high molecular compounds (as described in JP-A-59-68169), expanded metal (as described in JP-A-61-264686) and punched metal. For a negative electrode, ordinary stainless steel, nickel, titanium and aluminum as well as porous nickel (as described in JP-A-58-18883), porous aluminum (as described in JP-A-58-38466), sintered aluminum (as described in JP-A-59-130074), molded article of aluminum fiber group (as described in JP-A-59-148277), surface-silvered stainless steel (as described in JP-A-60-41761), calcined carbonaceous material such as calcined phenol resin (as described in JP-A-60-112264), Al-Cd alloy (as described in JP-A-60-211779), porous foamed metal (as described in JP-A-61-74268), etc. can be used.

As the collector any electron conductor which undergoes no chemical change in the battery can be used. As such an electron conductor commonly used stainless steel, titanium or nickel as well as nickel-plated copper (as described in JP-A-48-36627), titanium-plated copper, copper-treated stainless steel (for sulfide positive electrode active material) (as described in JP-A-60-175373) can be used.

There are several methods for sealing the battery. One of these methods is to dispose an insulating sealing material between a metal can serving also as one terminal and a metal cover or pin serving also as the other terminal. In this method, a metal can, an insulating sealing material, and a cover or pin are normally superimposed on each other. Pressure is applied to the opening of the metal can (or one of the pins) so that it is plastically deformed in such a direction that the insulating sealing material is depressed (referred to as "crimp sealing" or "caulking") to seal the battery. In this case, the sealant to be used in the present invention is applied to at least one of the surfaces of the insulating sealing material and the metal can in contact with each other or at least one of the surfaces of the insulating sealing material and the cover or pin in contact with each other (either or both surfaces in contact with each other). Another sealing method is to employ hermetic sealing for insulation. In this method, since hermetic sealing is normally applied to the cover, the cover is electrically isolated from its center to its outside. Therefore, the connection of the periphery of the cover to the metal can does not necessarily require an insulating sealing material. In order to crimp-seal this structure, the sealant to be used in the present invention may be interposed between the metallic portion at the periphery of the cover and the metal can (either or both of surfaces in contact with each other). When a structure having a hermetic seal and an insulating sealing material at the periphery of the cover is crimp-sealed, the sealant to be used in the present invention may be provided on at least one of the portions of the insulating sealing material and the cover in contact with each other or at least one of the portions of the insulating sealing material and the can in contact with each other (either or both surfaces in contact with each other). Further, the sealant to be used in the present invention may be applied to the portions at which airtightness is maintained by pressing a metal member against another or a metal member against a resin member (either or both of surfaces in contact with each other).

The shape of the battery of the present invention may be coin, button, cylinder, square, film or the like.

Preferred embodiments of the present invention will be given below:

(1) A nonaqueous battery comprising a positive electrode, a negative electrode made of an active material of light metal or its alloy or an active material capable of intercalating/deintercalating lithium ion, and a nonaqueous electrolyte, wherein the battery is sealed off with a sealant comprising a pitch and at least one montmorillonite group and the montmorillonite group is present in an amount of 2 to 30% by weight based on the total weight of the sealant minus solvents.

(2) A nonaqueous battery comprising a positive electrode, a negative electrode made of an active material of light metal or its alloy or an active material capable of intercalating/deintercalating lithium ion, and a nonaqueous electrolyte, wherein the battery is sealed off with a sealant comprising petroleum asphalt and at least one montmorillonite group comprising an amine or amine derivative intercalated between layers and the montmorillonite group is present in an amount of 2 to 30% by weight based on the total weight of the sealant minus solvents.

(3) A nonaqueous battery comprising a positive electrode, a negative electrode made of an active material of light metal or its alloy or an active material capable of intercalating/deintercalating lithium ion, and a nonaqueous electrolyte, wherein the battery is sealed off with a sealant comprising blown asphalt and at least one trioctahedron type montmorillonite group comprising a quaternary ammonium intercalated between layers and the montmorillonite group is present in an amount of 2 to 30% by weight based on the total weight of the sealant minus solvents.

(4) A nonaqueous battery comprising a positive electrode, a negative electrode made of an active material of light metal or its alloy or an active material capable of intercalating/deintercalating lithium ion, and a nonaqueous electrolyte, wherein the battery is sealed off with a sealant comprising blown asphalt having a penetration (25° C.) of 10 to 20 and a hectolite comprising a quaternary ammonium intercalated between layers and the hectolite is present in an amount of 2 to 30% by weight based on the total weight of the sealant minus solvents.

(5) A nonaqueous battery comprising a positive electrode, a negative electrode made of an active material of light metal or its alloy or an active material capable of intercalating/deintercalating lithium ion, and a nonaqueous electrolyte, wherein the battery is sealed off with a sealant comprising a pitch, at least one polymer and at least one montmorillonite group.

(6) The nonaqueous battery as defined in the clause (5), wherein the at least one polymer is a rubber.

(7) The nonaqueous battery as defined in the clause (5), wherein the at least one polymer is a nonsilicone rubber.

(8) The nonaqueous battery as defined in the clause (5), wherein the at least one polymer is EPDM.

(9) The nonaqueous battery as defined in the clause (5), wherein the at least one polymer is EPM.

(10) The nonaqueous battery as defined in the clause (5), wherein the at least one polymer is SBR.

(11) The nonaqueous battery as defined in the clause (5), wherein the at least one polymer is NBR.

(12) The nonaqueous battery as defined in the clause (5), wherein the at least one polymer is IR.

(13) The nonaqueous battery as defined in the clause (5), wherein the at least one polymer is CR.

(14) The nonaqueous battery as defined in the clause (5), wherein the at least one polymer is CSM.

(15) The nonaqueous battery as defined in the clause (5), wherein the at least one polymer is polybutene.

(16) The nonaqueous battery as defined in any of the clauses (5) to (15), wherein the at least one montmorillonite group is one comprising quaternary ammonium ion intercalated as an X ion between layers.

(17) The nonaqueous battery as defined in any of the clauses (5) to (15), wherein the at least one montmorillonite group is a three-octahedron type montmorillonite group comprising quaternary ammonium ion intercalated as an X ion between layers.

(18) The nonaqueous battery as defined in any of the clauses (5) to (15), wherein the at least one montmorillonite group is a hectolite comprising quaternary ammonium ion intercalated as an X ion between layers.

(19) The nonaqueous battery as defined in any of the clauses (5) to (18), wherein the pitch is petroleum asphalt.

(20) The nonaqueous battery as defined in any of the clauses (5) to (18), wherein the pitch is blown asphalt.

(21) The nonaqueous battery as defined in any of the clauses (5) to (18), wherein the pitch is blown asphalt having a penetration of 10 to 20 (as determined at a temperature of 25° C.).

(22) A nonaqueous battery comprising a positive electrode, a negative electrode made of an active material of light metal or its alloy or an active material capable of intercalating/deintercalating lithium ion, and a nonaqueous electrolyte, wherein the battery is sealed off with a sealant comprising blown asphalt, EPDM and at least one montmorillonite group comprising quaternary ammonium ion intercalated as an X ion between layers.

The present invention will be further described in the following examples, but the present invention should not be construed as being limited thereto. Amounts are by weight unless otherwise indicated.

EXAMPLE 1

Coin-shaped battery

Figure 1:
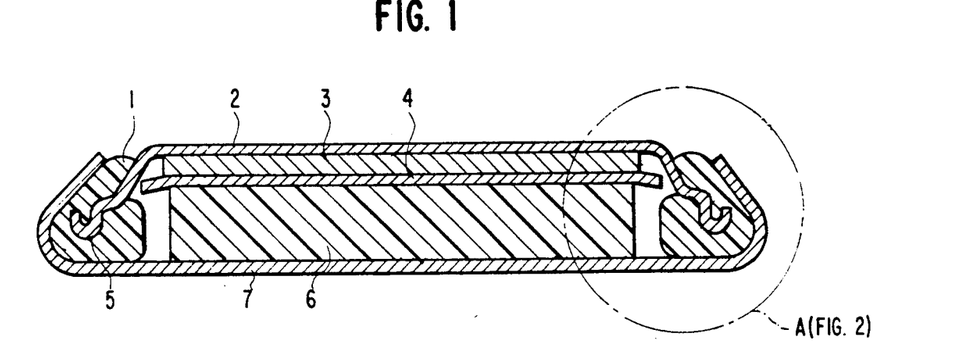
FIG. 1 illustrates an embodiment of a coin-shaped battery according to the present invention.

A coin-shaped lithium battery as shown in FIG. 1 was prepared from electricity-generating elements, including a positive electrode comprising $V_6O_{13}$ as a positive electrode active material (shown at 6 in FIG. 1), a Li-Al negative electrode (Al content: 20% by weight; shown at 3 in FIG. 1), 1 mol/l of an $LiBF_4$ electrolyte (a mixture of propylene carbonate and 1,2-dimethoxyethane in the same amount), and a separator made of a porous polypropylene membrane (shown at 4 in FIG. 1), with such various members as a stainless steel positive electrode can serving also as a positive terminal (shown at 1 in FIG. 1), a stainless steel negative electrode can serving also as a negative terminal (shown at 2 in FIG. 1), and an insulating sealing material made of a synthetic resin (polypropylene)(also referred to as "gasket"). In this procedure, a sealant having the composition as described below was coated and dried between the positive electrode can serving also as a positive electrode and the insulating sealing material and between the negative electrode can serving also as a negative electrode and the insulating sealing material to prepare a sealant layer (as shown at 15, 16, 17 in FIG. 2). The sealant comprised Blown Asphalt 10-20 (having a penetration of 10 to 20 at 25° C.), which is a petroleum asphalt, as a pitch and a hectolite comprising dimethylbenzyl dodecylammonium intercalated between layers as a montmorillonite group. Assuming that the abrasion of the sealing mold causes a reduction in the sealing strength, a sealing mold which had been scraped thinner than the specified value and another sealing mold which had been scraped further thinner than the specified value were employed to enable three adjustments in the sealing strength, i.e., normal, slightly weaker and weaker.

| Composition of sealant | |
|---|---|
| Blown Asphalt 10-20 | 98 g |
| Montmorillonite group | 2 g |
| Toluene | 500 g |

EXAMPLE 2

Coin-shaped battery

A battery was prepared in the same manner as in Example 1 except that the following composition was used as the sealant:

| Composition of sealant | |
|---|---|
| Blown Asphalt 10-20 | 95 g |
| Montmorillonite group | 5 g |
| Toluene | 900 g |

EXAMPLE 3

Coin-shaped battery

A battery was prepared in the same manner as in Example 1 except that the following composition was used as the sealant:

| Composition of sealant | |
|---|---|
| Blown Asphalt 10-20 | 70 g |
| Montmorillonite group | 30 g |
| Toluene | 900 g |

EXAMPLE 4

Coin-shaped battery

A battery was prepared in the same manner as in Example 1 except that the following composition was used as the sealant. The montmorillonite group used was a hectolite comprising sodium intercalated between layers.

| Composition of sealant | |
|---|---|
| Blown Asphalt 10-20 | 95 g |
| Montmorillonite group | 5 g |
| Toluene | 100 g |

EXAMPLE 5

Coin-shaped battery

A battery was prepared in the same manner as in Example 1 except that the following composition was used as the sealant. The montmorillonite group used was a montmorillonite comprising dioctadecyl dimethylammonium intercalated between layers.

| Composition of sealant | |
|---|---|
| Blown Asphalt 10-20 | 95 g |
| Montmorillonite group | 5 g |
| Toluene | 900 g |

COMPARATIVE EXAMPLE 1

Battery comprising blown asphalt and silicone rubber

A battery was prepared in the same manner as in Example 1 except that the following composition was used as the sealant:

| Composition of sealant | |
| --- | --- |
| Blown Asphalt 10-20 | 95 g |
| Silicone rubber | 5 g |
| Toluene | 200 g |

COMPARATIVE EXAMPLE 2

Battery comprising aqueous dispersion of asphalt and SBR

A battery was prepared in the same manner as in Example 1 except that the following composition was used as the sealant:

Composition of sealant

1:1 (weight ratio) mixture of an asphalt dispersion obtained by dispersing a toluene solution of an asphalt in water with a cationic surface active agent with stirring and a rubber latex obtained by dispersing and suspending an emulsion-polymerized styrene-butadiene rubber in water

COMPARATIVE EXAMPLE 3

Battery comprising blown asphalt and mineral oil

A battery was prepared in the same manner as in Example 1 except that the following composition was used as the sealant:

| Composition of sealant | |
| --- | --- |
| Blown Asphalt 10-20 | 90 g |
| Mineral oil | 10 g |
| Toluene | 200 g |

COMPARATIVE EXAMPLE 4

Battery comprising blown asphalt alone

A battery was prepared in the same manner as in Example 1 except that the following composition was used as the sealant:

| Composition of sealant | |
| --- | --- |
| Blown Asphalt 10-20 | 100 g |
| Toluene | 200 g |

EXAMPLE 6

Cylindrical battery

Figure 3:
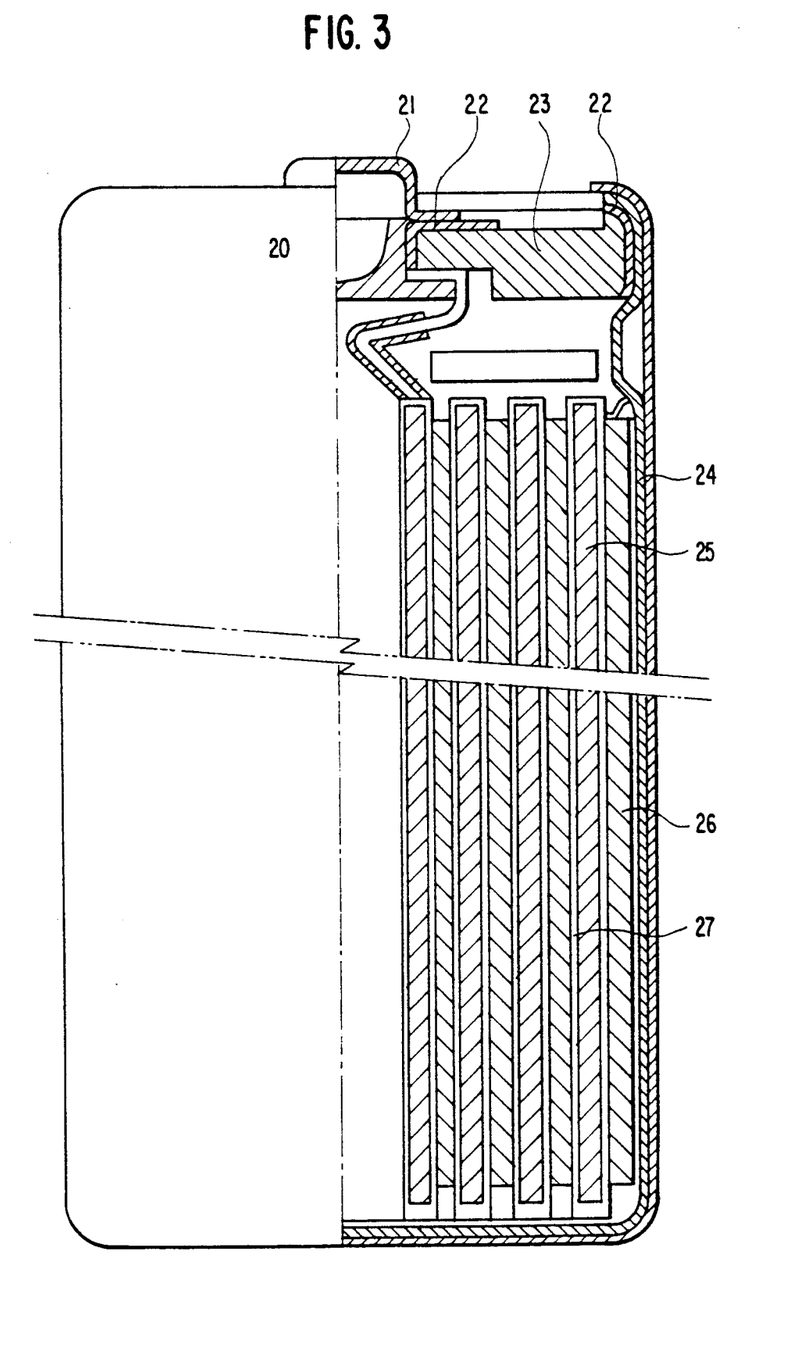

A cylindrical lithium battery as shown in FIG. 3 was prepared from electricity-generating elements, including a sheet positive electrode comprising $V_6O_{13}$ coated on an aluminum collector as a positive electrode active material (shown at 25 in FIG. 3), a Li-Al negative electrode (Al content: 20% by weight; shown at 26 in FIG. 3), 1 mol/l of an $LiBF_4$ electrolyte (a mixture of propylene carbonate and 1,2-dimethoxyethane in the same amount), and a separator made of a porous polypropylene membrane (shown at 27 in FIG. 3), with such various members as positive electrode pin and positive electrode cap made of an aluminum plate serving also as a positive terminal (shown at 20, 21 in FIG. 3), a negative electrode can made of a nickel-plated iron plate serving also as a negative terminal (shown at 24 in FIG. 3), and an insulating sealing material made of a synthetic resin (polypropylene)(also referred to as "gasket"; shown at 23 in FIG. 3). In this procedure, the sealant having the composition as used in Example 2 was coated and dried between the positive electrode pin serving also as a positive metal terminal and the insulating sealing material and between the negative electrode can serving also as a negative metal terminal and the insulating sealing material to prepare a sealant layer (as shown at 22 in FIG. 3; the same sealant material and sealing strength as in Example 1).

COMPARATIVE EXAMPLE 5

Cylindrical battery comprising silicone rubber

A battery was prepared in the same manner as in Example 6 except that the sealant composition used in Comparative Example 1 was employed.

(1) Liquid leakage test for battery in Examples and Comparative Examples 100 pieces (50 pieces for cylindrical battery) of each of the aforementioned 11 kinds of batteries were prepared with the respective sealing strength, and then examined for liquid leakage in the same manner:

(a) Liquid leakage test method (example of storage test at an elevated temperature)

These specimens were stored in an air circulation type chamber adjusted to a temperature of 60° C. and a relative humidity of 90% for 100 days. The number of specimens causing liquid leakage was determined. In the table below, the figure indicates the number of specimens causing liquid leakage out of 100 specimens (50 pieces for cylindrical battery).

(b) Results of liquid leakage test

The results are set forth in Table 1.

TABLE 1

| | Sealing strength | | |
| --- | --- | --- | --- |
| | Normal | Slightly weaker | Weaker |
| Example 1 | 0 | 0 | 1 |
| Example 2 | 0 | 0 | 0 |
| Example 3 | 0 | 1 | 1 |
| Example 4 | 0 | 1 | 1 |
| Example 5 | 0 | 0 | 1 |
| Example 6 | 0 | 0 | 0 |
| Comparative Example 1 | 0 | 2 | 6 |
| Comparative Example 2 | 0 | 2 | 5 |
| Comparative Example 3 | 1 | 3 | 7 |
| Comparative Example 4 | 2 | 4 | 9 |
| Comparative Example 5 | 0 | 1 | 3 |

The results show that the batteries of the present invention prepared in Examples 1, 2, 3, 4, 5 and 6 exhibit an excellent resistance to liquid leakage under the conditions of weak sealing strength as compared with the batteries prepared in the comparative examples.

EXAMPLE 7

Coin-shaped battery

A battery was prepared in the same manner as in Example 1 except that the following composition was used as the sealant. EPDM (ethylene/propylene proportion (by weight)=50/50; Mooney viscosity (100° C.)=45; diene unit: ethylidene norbornene) was used as the polymer.

| Composition of sealant | |
| --- | --- |
| Pitch | 95 g |
| Polymer | 5 g |
| Montmorillonite group | 5 g |
| Toluene | 400 g |

EXAMPLE 8

Coin-shaped battery

A battery was prepared in the same manner as in Example 1 except that the following composition was used as the sealant. Montmorillonite comprising diocta­decyl-dimethylammonium intercalated between layers was used as the montmorillonite group.

| Composition of sealant | |
| --- | --- |
| Pitch | 95 g |
| Polymer | 5 g |
| Montmorillonite group | 5 g |
| Toluene | 400 g |

EXAMPLE 9

Coin-shaped battery

A battery was prepared in the same manner as in Example 1 except that the following composition was used as the sealant. Hectolite comprising sodium intercalated between layers was used as the montmorillonite group.

| Composition of sealant | |
| --- | --- |
| Pitch | 95 g |
| Polymer | 5 g |
| Montmorillonite group | 5 g |
| Toluene | 100 g |

EXAMPLE 10

Coin-shaped battery

A battery was prepared in the same manner as in Example 1 except that the following composition was used as the sealant. IR (Mooney viscosity: 70) was used as the polymer.

| Composition of sealant | |
| --- | --- |
| Pitch | 90 g |
| Polymer | 10 g |
| Montmorillonite group | 5 g |
| Toluene | 400 g |

EXAMPLE 11

Coin-shaped battery

A battery was prepared in the same manner as in Example 1 except that the following composition was used as the sealant. Polybutene (average molecular weight: 1,350) was used as the polymer.

| Composition of sealant | |
| --- | --- |
| Pitch | 95 g |
| Polymer | 30 g |
| Montmorillonite group | 5 g |
| Toluene | 400 g |

COMPARATIVE EXAMPLES 1' to 4'

Batteries were prepared in the same manner as in the aforementioned Comparative Examples 1 to 4, respectively.

(2) Liquid leakage test for battery in Examples and Comparative Examples 100 pieces of each of the aforementioned 9 kinds of batteries were prepared with the respective sealing strength, and then examined for liquid leakage in the same manner:

(a) Liquid leakage test method (example of cold-hot cycle test)

These specimens were alternatively put in two air circulating chambers which had been adjusted to temperatures of minus 60° C. and 10° C., respectively, for 60 minutes. This cycle was repeated 100 times. These specimens were then allowed to stand at room temperature for 30 days. The number of specimens causing liquid leakage was determined. In the table below, the figure indicates the number of specimens causing liquid leakage out of 100 specimens.

(b) Results of liquid leakage test

The results are set forth in Table 2.

TABLE 2

| | Sealing strength | | |
| --- | --- | --- | --- |
| | Normal | Slightly weaker | Weaker |
| Example 7 | 0 | 0 | 0 |
| Example 8 | 0 | 0 | 1 |
| Example 9 | 0 | 1 | 2 |
| Example 10 | 0 | 0 | 0 |
| Example 11 | 0 | 2 | 3 |
| Comparative Example 1' | 2 | 24 | 47 |
| Comparative Example 2' | 3 | 26 | 48 |
| Comparative Example 3' | 9 | 31 | 53 |
| Comparative Example 4' | 11 | 40 | 69 |

The results show that the batteries of the present invention prepared in Examples 7, 8, 9, 10, and 11 exhibit an excellent resistance to liquid leakage under the conditions of weak sealing strength as compared with the batteries prepared in the comparative examples.

As mentioned above, the present invention can provide a nonaqueous battery which exhibits an excellent resistance to liquid leakage against the fluctuations of the sealing strength even at low temperatures.

As mentioned above, the present invention can provide a nonaqueous battery which is not affected by the fluctuations of the sealing strength.

While the invention has been described in detail and with reference to specific embodiments thereof, it will be apparent to one skilled in the art that various changes and modifications can be made therein without departing from the spirit and scope thereof.

What is claimed is:

1. A nonaqueous battery comprising a positive electrode, a negative electrode made of an active material of a light metal or its alloy or an active material capable of intercalating/deintercalating lithium ion, and a nonaqueous electrolyte, wherein the battery is sealed with a sealant comprising a pitch and at least one montmorillonite group material.

2. The nonaqueous battery as claimed in claim 1, wherein the amount of the montmorillonite group material is 2 to 30% by weight based on the total weight of the sealant minus solvents.

3. The nonaqueous battery as claimed in claim 2, wherein the pitch is petroleum asphalt and the at least one montmorillonite group material is a montmorillonite group material comprising an amine or amine compound intercalated between layers.

4. The nonaqueous battery as claimed in claim 2, wherein the pitch is petroleum asphalt and the at least one montmorillonite group material is a montmorillonite group material comprising an amine or amine compound intercalated between layers.

5. The nonaqueous battery as claimed in claim 2, wherein the pitch is blown asphalt having a penetration at 25° C. of 10 to 20 and at least one montmorillonite group material is a hectolite comprising a quaternary ammonium intercalated between layers.

6. The nonaqueous battery as claimed in claim 1, wherein the pitch is blown asphalt having a penetration of 5 to 30.

7. The nonaqueous battery as claimed in claim 1, wherein the pitch is blown asphalt having a softening point of 60° C. or higher.

8. The nonaqueous battery as claimed in claim 1, wherein the pitch is blown asphalt having a softening point of 80° C. or higher.

9. The nonaqueous battery as claimed in claim 1, wherein the pitch is blown asphalt having a softening point of 90° C. or higher.

10. The nonaqueous battery as claimed in claim 1, wherein the pitch is blown asphalt having a penetration of 10 to 20 and a softening point of 90° C. to 100° C.

11. The nonaqueous battery as claimed in claim 1, wherein the pitch is blown asphalt having a penetration of 10 to 20 and a softening point of 135° C. to 155° C.

12. A nonaqueous battery comprising a positive electrode, a negative electrode made of an active material of a light metal or its alloy or an active material capable of intercalating/deintercalating lithium ion, and a nonaqueous electrolyte, wherein the battery is sealed with a sealant comprising a pitch, at least one polymer and at least one montmorillonite group material.

13. The nonaqueous battery as claimed in claim 12, wherein the at least one polymer is a rubber.

14. The nonaqueous battery as claimed in claim 12, wherein the at least one polymer is a nonsilicone rubber.

15. The nonaqueous battery as claimed in claim 12, wherein the at least one polymer is ethylene-propylene-diene monomer rubber.

16. The nonaqueous battery as claimed in claim 12, wherein the at least one polymer is ethylene-propylene rubber.

17. The nonaqueous battery as claimed in claim 12, wherein the at least one polymer is styrene-butadiene rubber.

18. The nonaqueous battery as claimed in claim 12, wherein the at least one polymer is nitrile rubber.

19. The nonaqueous battery as claimed in claim 12, wherein the at least one polymer is isoprene rubber.

20. The nonaqueous battery as claimed in claim 12, wherein the at least one polymer is chloroprene rubber.

21. The nonaqueous battery as claimed in claim 12, wherein the at least one polymer is chlorosulfonate polyethylene.

22. The nonaqueous battery as claimed in claim 12, wherein the at least one polymer is polybutene.

23. The nonaqueous battery as claimed in claim 12, wherein the at least one montmorillonite group material is one comprising a quaternary ammonium ion intercalated as an ion between layers.

24. The nonaqueous battery as claimed in claim 12, wherein the at least one montmorillonite group material is a three-octahedron type montmorillonite group material comprising a quaternary ammonium ion as an ion between layers.

25. The nonaqueous battery as claimed in claim 12, wherein the at least one montmorillonite group material is a hectolite comprising a quaternary ammonium ion as an ion between layers.

26. The nonaqueous battery as claimed in claim 12, wherein the pitch is petroleum asphalt.

27. The nonaqueous battery as claimed in claim 12, wherein the pitch is blown asphalt.

28. The nonaqueous battery as claimed in claim 12, wherein the pitch is blown asphalt having a penetration of 10 to 20 as determined at a temperature of 25° C.

29. The nonaqueous battery as claimed in claim 12, wherein the pitch is blown asphalt, the at least one polymer is an ethylene-propylene-diene monomer rubber and the at least one montmorillonite group material is a montmorillonite group material comprising a quaternary ammonium ion intercalated as an ion between layers.

* * * * *